United States Patent
Woodman

(10) Patent No.: US 8,195,815 B2
(45) Date of Patent: Jun. 5, 2012

(54) EFFICIENT NETWORK MONITORING AND CONTROL

(75) Inventor: Alistair Woodman, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 325 days.

(21) Appl. No.: 11/981,189

(22) Filed: Oct. 31, 2007

(65) Prior Publication Data

US 2009/0113062 A1    Apr. 30, 2009

(51) Int. Cl.
*G06F 15/16* (2006.01)

(52) U.S. Cl. ........ 709/229; 709/206; 709/224; 709/228; 705/1; 705/37; 705/40; 726/22; 726/27; 370/230; 370/282

(58) Field of Classification Search ........... 709/223–229
See application file for complete search history.

(56) References Cited

U.S. PATENT DOCUMENTS

| | | | |
|---|---|---|---|
| 5,335,225 A * | 8/1994 | Brax | 370/282 |
| 6,321,264 B1 | 11/2001 | Fletcher et al. | |
| 6,330,610 B1 * | 12/2001 | Docter et al. | 709/229 |
| 6,820,117 B1 * | 11/2004 | Johnson | 709/223 |
| 7,009,992 B2 * | 3/2006 | McKinnon et al. | 370/443 |
| 7,206,814 B2 * | 4/2007 | Kirsch | 709/206 |
| 7,493,659 B1 * | 2/2009 | Wu et al. | 726/26 |
| 7,873,736 B1 * | 1/2011 | Sethi et al. | 709/229 |
| 2002/0021665 A1 * | 2/2002 | Bhagavath et al. | 370/229 |
| 2002/0126686 A1 * | 9/2002 | McKinnon et al. | 370/442 |
| 2003/0005125 A1 * | 1/2003 | Berthaud et al. | 709/226 |
| 2003/0037251 A1 * | 2/2003 | Frieder et al. | 713/200 |
| 2003/0110188 A1 * | 6/2003 | Howard et al. | 707/200 |
| 2003/0144951 A1 * | 7/2003 | Leven | 705/40 |
| 2004/0006630 A1 * | 1/2004 | Friend et al. | 709/229 |
| 2004/0039827 A1 * | 2/2004 | Thomas et al. | 709/228 |
| 2004/0073634 A1 * | 4/2004 | Haghpassand | 709/220 |
| 2004/0128557 A1 * | 7/2004 | Sakushima et al. | 713/202 |
| 2004/0252837 A1 * | 12/2004 | Harvey et al. | 380/270 |
| 2005/0071445 A1 * | 3/2005 | Siorek et al. | 709/223 |
| 2005/0144297 A1 * | 6/2005 | Dahlstrom et al. | 709/229 |
| 2005/0183143 A1 * | 8/2005 | Anderholm et al. | 726/22 |
| 2006/0050721 A1 * | 3/2006 | Ganesan | 370/401 |
| 2006/0067216 A1 * | 3/2006 | Lalonde et al. | 370/230 |
| 2006/0106922 A1 * | 5/2006 | Arregoces et al. | 709/223 |
| 2006/0212925 A1 * | 9/2006 | Shull et al. | 726/1 |
| 2006/0230461 A1 * | 10/2006 | Hauser | 726/27 |
| 2006/0277591 A1 * | 12/2006 | Arnold et al. | 726/1 |
| 2007/0133537 A1 * | 6/2007 | Oliver et al. | 370/392 |
| 2007/0136178 A1 * | 6/2007 | Wiseman et al. | 705/37 |
| 2007/0180525 A1 * | 8/2007 | Bagnall | 726/23 |
| 2007/0239684 A1 * | 10/2007 | Anderson et al. | 707/3 |
| 2007/0282952 A1 * | 12/2007 | Lund et al. | 709/206 |

(Continued)

*Primary Examiner* — Wing Chan
*Assistant Examiner* — Razu Miah
(74) *Attorney, Agent, or Firm* — Cindy Kaplan

(57) ABSTRACT

In one embodiment, a method for monitoring traffic associated with users in a network includes assigning a trust level to each of the users, monitoring traffic associated with each of the users, and analyzing the monitored traffic. A level of monitoring is based on the trust level of the user. A user's trust level is modified if the analyzed traffic indicates that the user is operating outside of specified network usage parameters. An apparatus for monitoring traffic associated with users in a network is also disclosed.

20 Claims, 4 Drawing Sheets

U.S. PATENT DOCUMENTS

| | | | |
|---|---|---|---|
| 2008/0034424 A1* | 2/2008 | Overcash et al. | 726/22 |
| 2008/0059216 A1* | 3/2008 | Fromentoux et al. | 705/1 |
| 2008/0059631 A1* | 3/2008 | Bergstrom et al. | 709/224 |
| 2008/0307320 A1* | 12/2008 | Payne et al. | 715/751 |
| 2009/0113062 A1* | 4/2009 | Woodman | 709/229 |
| 2009/0222556 A1* | 9/2009 | Chapman et al. | 709/224 |

* cited by examiner

EFFICIENT NETWORK MONITORING AND CONTROL

BACKGROUND OF THE INVENTION

The present disclosure relates generally to network monitoring and control and more specifically, to monitoring and controlling traffic associated with users of a network.

With increase emphasis on profitability and efficient operations, operators of networks (both service providers (SPs) and enterprises) are focusing on the specific use of bandwidth and network resources consumed by their subscribers and the classes of traffic that are being generated. Service providers and enterprise network operators offer Service Level Agreements (SLAs) and Acceptable Use Policies (AUPs) to their users. Most users and subscribers abide by these agreements, but in typical networks there is a reasonably sized minority of users that attempt to use more than their share of network bandwidth, which results in inefficiencies with respect to the shared infrastructure. This type of behavior can have a significant impact on shared resource systems. In order to limit the impact of users abusing their share of system resources, network operators are forced to invest in resources that monitor, control, and limit such behavior.

Layer 4 to layer 7 network devices, which provide intelligent application traffic management capabilities, including inspection, access control, and bandwidth management, may be used to monitor and control network traffic. This layer 4-7 inspection and control requires orders of magnitudes more processing power by the network devices than the basic function of packet forwarding at layer 3. Conventional use of layer 4-layer 7 control products to measure and enforce SLAs and AUPs for each network user therefore requires large amounts of dedicated hardware.

BRIEF DESCRIPTION OF THE DRAWINGS

Corresponding reference characters indicate corresponding parts throughout the several views of the drawings.

DESCRIPTION OF EXAMPLE EMBODIMENTS

Overview

A method and system for monitoring traffic associated with users in a network are disclosed. In one embodiment, a method generally comprises assigning a trust level to each of the users, monitoring traffic associated with each of the users, and analyzing the monitored traffic. The level of monitoring is based on the trust level of the user. A user's trust level is modified if the analyzed traffic indicates that the user is operating outside of specified network usage parameters.

Example Embodiments

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Figure 1:
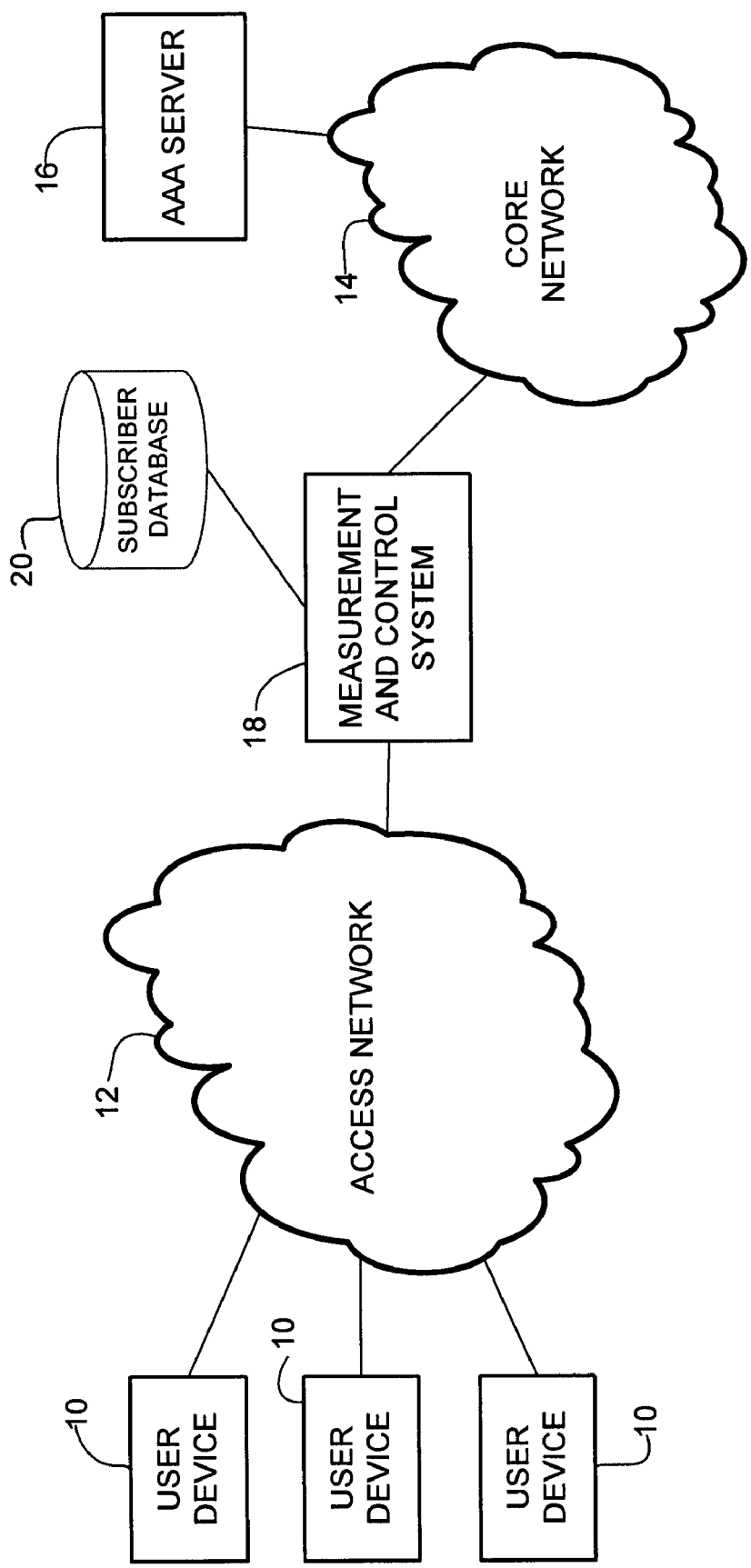
FIG. 1 illustrates an example of a network in which embodiments described herein may be implemented.

Referring now to the drawings, and first to FIG. 1, one example of a network that may implement embodiments described herein is shown. The embodiments operate in the context of a data communication network including multiple network elements. For simplification, only a small number of nodes are shown. Some of the nodes in a network that employs the embodiments may be network devices such as routers, switches, gateways, firewall, or other network devices. The network device may include, for example, a master central processing unit (CPU), interfaces, and a bus. The CPU preferably includes memory and a processor. The network device may be implemented on a general purpose network host machine such as a computer system or network device described below with respect to FIG. 4.

The network includes one or more users devices (e.g., personal computer, PDA (personal digital assistant), or other network device) 10 in communication with an access network 12, which connects the user (subscriber) with a service provider or enterprise network (core network) 14. For example, in FIG. 1, network 14 labeled 'core network' may be a service provider network. The access network 12 may be a residential access network connecting an end system located in a home using, for example, a telephone line, ADSL (asymmetric digital subscriber line), or cable. The access network 12 may also be an institutional access network (connecting an end system located within an enterprise (e.g., university or business) or a mobile access (wireless) network, for example.

The SP network 14 includes an AAA server 16, which functions as a source or database for storing user information that includes identity and authorization. The AAA server 16 performs authorization, authentication, and accounting functions by interacting with network access servers, or gateways and databases or directories containing user information. The AAA server 16 may be, for example, a RADIUS (Remote Authentication Dial-In User Service) server or a TACACS (Terminal Access Controller Access Control System) server.

A measurement and control system (MCS) 18 is located between the access network 12 and service provider or enterprise network (core network) 14. The MCS 18 may be located at a gateway, firewall, router, or other network device. The measurement and control system 18 is coupled to a subscriber database 20, which may be located at the same network device as the MCS or at a server or other device in communication with the MCS.

It is to be understood that the network shown in FIG. 1 is only one example and that different network configurations and network devices may be used without departing from the scope of the invention. For example, FIG. 1 shows one MCS 18 interposed between the access network 12 and core network 14, however, any number of measurement and control systems may be used to monitor and control traffic in the core network 14.

The service provider or enterprise typically provides a network subscriber (end user) with a Service Level Agreement (SLA) and Acceptable Use Policies (AUP) (referred to collectively herein as "agreement"). The SLA outlines certain guarantees to provide access to a network. For example, the SLA may specify a network uptime guarantee or allocate a bandwidth usage for the subscriber. The AUP describes proper kinds of conduct and prohibited uses of the services provided by the SP. For example, the AUP may list a number of activities that constitute violation of the AUP.

The measurement and control system 18 is used to monitor activity of subscribers on the network and determine which subscribers are violating their agreement so that the system can use most of its control resources on subscribers that are not operating in accordance with their agreements. As described in detail below, the system 18 assigns a trust level, which is a dynamic property (or set of properties) to each subscriber (or group of subscribers) and then monitors the behavior of the subscriber to determine if the subscriber should be more closely monitored or policed (e.g., decrease trust level), or if a notification should be sent to the subscriber or to a service provider operator.

The trust level is associated with a user (e.g., subscriber, user device, group of users). There may be any number of trust levels. In one embodiment, there are only two levels; trustworthy and untrustworthy. In this case stricter monitoring and policing control is placed on the untrustworthy subscribers. In another embodiment there are varying levels of trust (e.g., trust level A, trust level B, trust level C . . . ). The monitoring and policing preferably vary according to the trust level associated with the subscriber.

Figure 2:
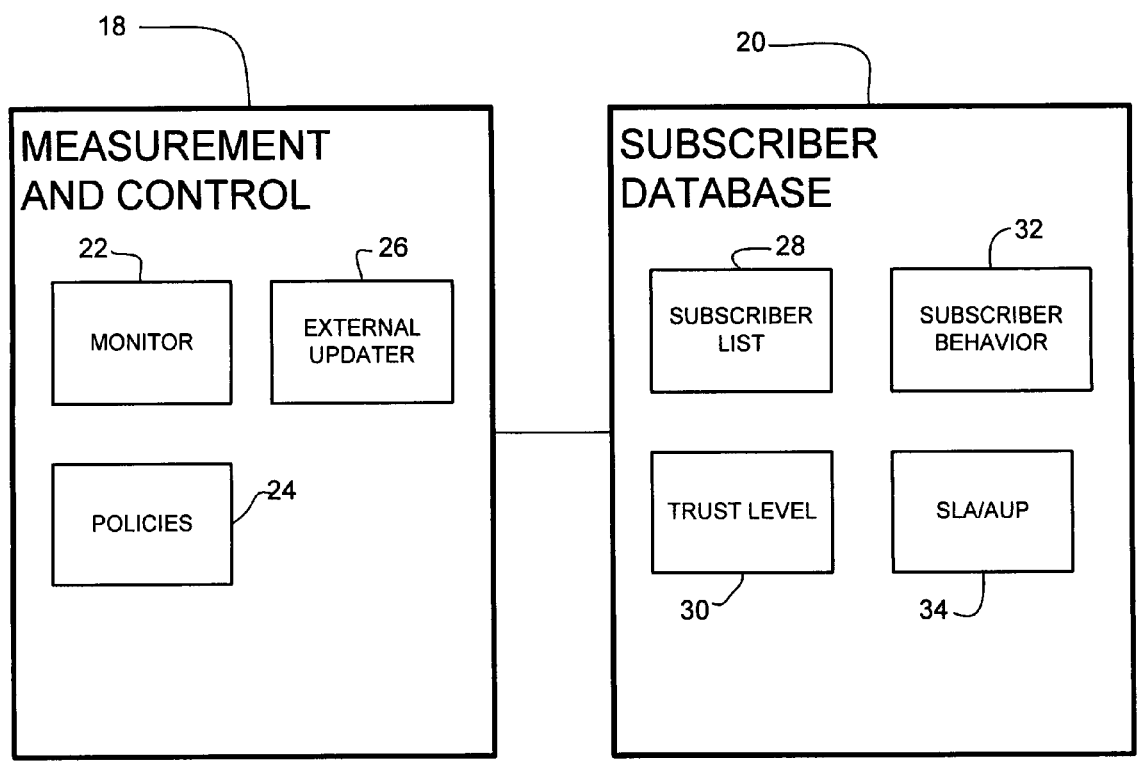
FIG. 2 is a block diagram illustrating one embodiment of a system for monitoring and controlling network usage.

Details of one embodiment of the MCS 18 and subscriber database 20 are shown in FIG. 2. The measurement and control system 18 includes a monitor 22 operable to measure traffic and perform network analysis on data passing through the system and associated with a specified subscriber. In one embodiment, the monitoring is performed at network layers 4-7. The system 18 further includes policies 24 and an external updater 26. The policies 24 are associated with one or more trust levels so that specific control policies can be enforced based on the trust level of the user transmitting the data.

The subscriber database 20 maintains a list of users that subscribe to the network 14 coupled to the MCS 18. The subscriber database 20 also stores a trust level 30 assigned to each subscriber. An example of a list of users and associated trust levels is shown below in Table I. Additional information such as SLA or AUP requirements 34 and past subscriber behavior 32 may also be maintained in the subscriber database 20 for each user or a portion of the users. This data may be stored in the form of tables or any other suitable format.

TABLE I

| USER | TRUST LEVEL |
| --- | --- |
| User A | Trustworthy |
| User B | Untrustworthy |
| User group C | Trustworthy |
| User device D | Trustworthy |

In order to function with less processing resources, the MCS 18 exploits the assumption that system offenders are a reasonably small portion of the overall subscriber base. The system thus trades off tight control with reasonably good control at a fraction of the processing cost. The system is configured to learn to identify those subscribers operating outside their SLAs or AUPs, and monitor and control them using additional resources than that required for trustworthy subscribers.

The initial trust level for each subscriber may be set to an initial seed level based on prior information or policy, or analysis of usage records of all subscribers. The initial trust level may also be set randomly or the same for all new subscribers. Once the measurement and control system 18 has been initialized and a trust level set for all subscribers, the system continues to maintain and update the trust level for each subscriber.

The monitor 22 includes measurement processing resources to provide internal updates to a trust level associated with a subscriber. Based on the measurements and analysis, the subscriber database 20 is updated to adjust a subscriber's trust level. The update may be performed periodically, or may be performed upon reaching a specified threshold. The subscriber's trust level may be reduced if the subscriber is exhibiting some improper behavior. If a subscriber's trust level has previously been lowered, it may subsequently be raised if performance remains acceptable for a specified period of time. Individual adjustments to the trust level may be gradual (e.g., subscriber is slightly more or less trustworthy), or absolute (e.g., subscriber is now deemed untrustworthy). The decision to adjust the trust level may be made based on a comparison of the subscriber behavior relative to a mean SLA or AUP characteristic 34 stored in the subscriber database 20. For example, the trust level may be changed if a user operates outside of a specified parameter such as bandwidth usage. Different network usage limits may be applied to different users or different classes of traffic. In one example, an adjustment is made only when the subscriber behavior deviates beyond a specified amount from a threshold value or the unacceptable subscriber behavior continues for a set period of time or number of occurrences.

Updates to the trust level may also be based on external inputs via the external updater interface 26, or based on updates to the MCS 18 or subscriber database 20. The external updates may take place according to a push model (e.g., routing type update protocols) or pull models (e.g., AAA protocols).

The MCS 18 uses a current set of subscriber trust levels to determine whether to engage in more or less monitoring of each subscriber over the next processing period. The level of monitoring is based on the trust level of the user. The MCS 18 applies proportionally more control and measurement resources to the streams and packets of those subscribers that are the least trustworthy. By focusing its resources on the least trustworthy users, the MCS 18 can control the worst offenders with substantially less resources than full monitoring for all subscribers requires.

The MCS 18 preferably continues to monitor trustworthy subscribers (although not as strictly as subscribers identified as untrustworthy). The MCS 18 thus continues to monitor the group of subscribers that are currently perceived as trustworthy to identify any misclassifications or catch changes in subscriber behavior. The system may also have set relaxation periods during which the trust levels are changed to a default value of trust. Known bad subscribers may have different default trust levels than other subscriber.

The policies 24 may be applied according to various algorithms which define a desired policing within the system. The policies 24 are configured to apply more resources and tighter policies to the subscribers identified as untrustworthy. The amount of resources used to monitor and police the untrustworthy subscribers may vary, and may be set or changed by the service provider.

Figure 3:
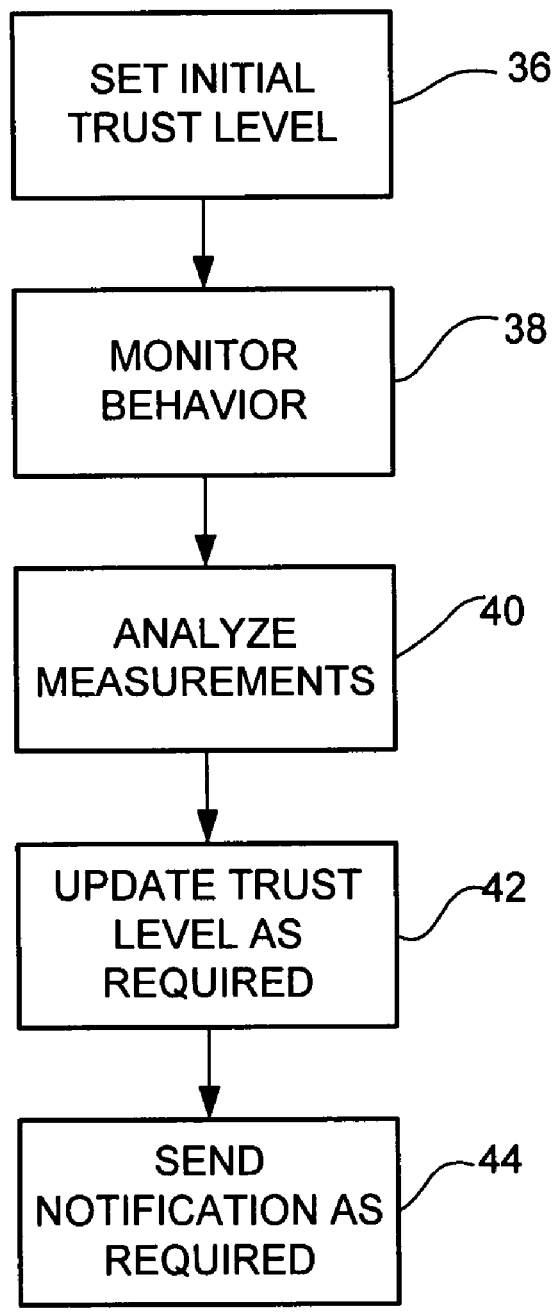
FIG. 3 is a flowchart illustrating an example of a process for monitoring and controlling network usage.

FIG. 3 is a flowchart illustrating a process for network monitoring and control according to one embodiment. At step 36 the initial trust level is set for each user, as discussed above. The behavior of the subscribers is monitored at step 38 and analyzed at step 40. The analysis may be performed using, for example, NetFlow, Network-Based Application Recognition (NBAR), Deep Packet Inspection (DPI), or any other suitable application. The analysis may simply be a comparison of the monitored traffic to a set limit or threshold. If the analyzed traffic indicates that the user is operating outside of specified network usage parameters (e.g., beyond a set bandwidth limit), the subscriber's trust level is reduced (step 42). A subscriber's trust level may also be increased if his behavior has improved. The MCS 18 may be configured to send a notification if a user is operating outside of the service agreement (step 44). For example, the MCS 18 may transmit a warning to the user. The MCS 18 may also send a notification to a service provider network operator to alert them of the misbehaving subscriber. The network operator may then take action, such as sending a warning to the subscriber, terminating the subscriber's access to the network, or requesting that the subscriber pay an additional fee if he wants to continue to operate outside of the agreement. The MCS 18 may also be configured to notify a system operator in case of illegal activity or spam, for example.

It is to be understood that the process shown in FIG. 3 and described above is only one example and that steps may be added, removed, or modified without departing from the scope of the invention.

Figure 4:
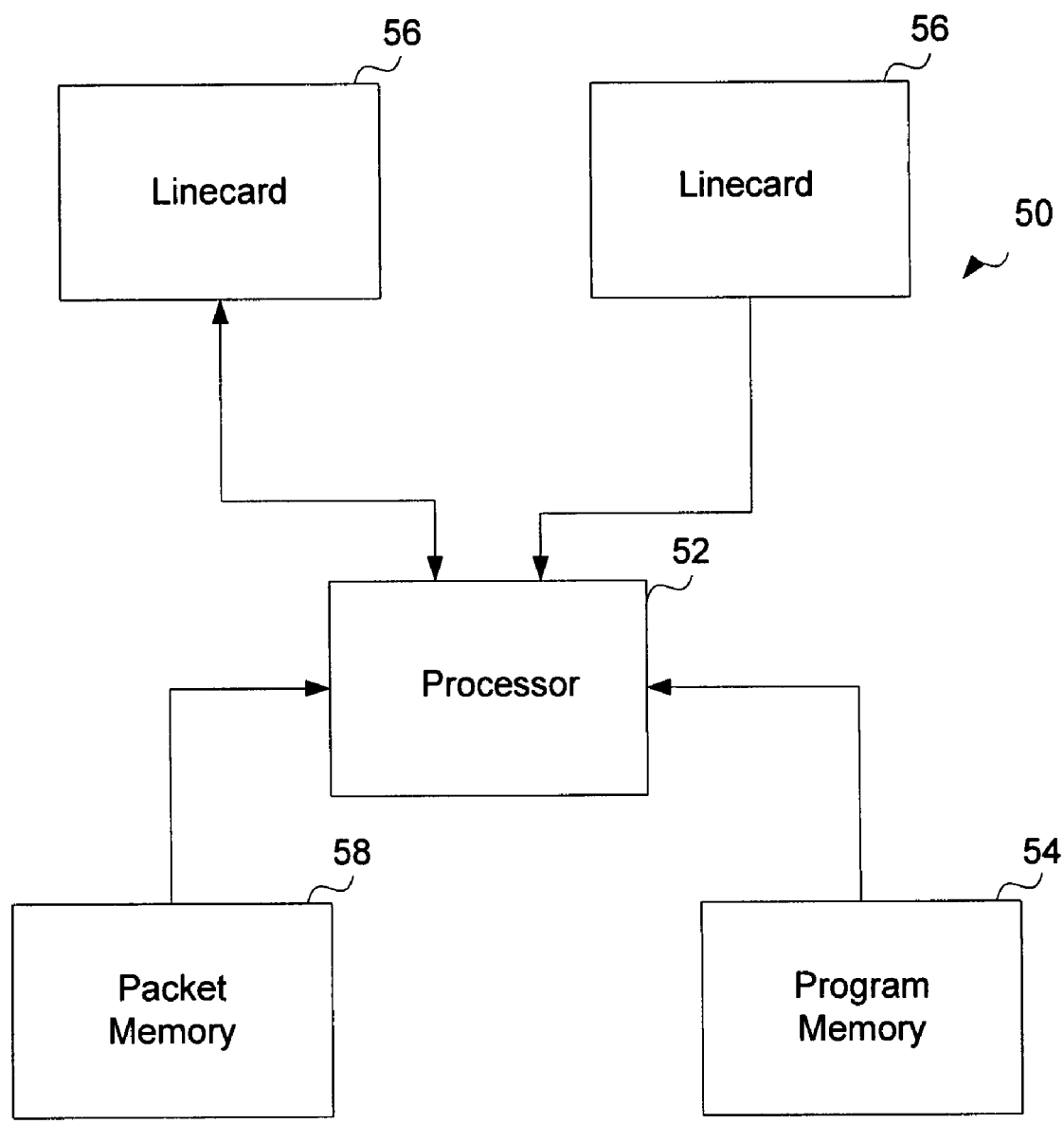
FIG. 4 depicts an example of a network device useful in implementing embodiments described herein.

FIG. 4 depicts a network device 50 that may be used to implement embodiments described herein. In one embodiment, network device 50 is a programmable machine that may be implemented in hardware, software, or any combination thereof. A processor 52 executes codes stored in a program memory 54. Program memory 54 is one example of a computer-readable medium. Program memory 54 can be a volatile memory. Another form of computer-readable medium storing the same codes would be some type of non-volatile storage such as floppy disks, CD-ROMs, DVD-ROMs, hard disks, flash memory, etc. A carrier wave that carries the code across the network is an example of a transmission medium.

Network device 50 interfaces with physical media via a plurality of linecards 56. Linecards 56 may incorporate Ethernet interfaces, DSL interfaces, Gigabit Ethernet interfaces, 10-Gigabit Ethernet interfaces, SONET interfaces, etc. As packets are received, processed, and forwarded by network device 50, they may be stored in a packet memory 58. To implement functionality according to the system, linecards 56 may incorporate processing and memory resources similar to those discussed above in connection with the network device as a whole.

Although the method and system have been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method comprising:
    assigning a trust level to each of a plurality of users in a network;
        setting a monitoring level for each of said plurality of users based on said trust level of the user;
        monitoring at a network device, traffic associated with each of said plurality of users at the set monitoring levels, wherein monitoring comprises measuring data traffic transmitted between the network device and each of said plurality of users assigned a trust level;
        analyzing at the network device, the monitored traffic associated with each of said plurality of users, wherein analyzing comprises comparing said measured data traffic to specified network usage parameters; and
        modifying said trust level of one or more of said plurality of users if the analyzed traffic indicates that the one or more of said plurality of users is operating outside of the specified network usage parameters;
    wherein modifying said trust level of the user comprises decreasing said trust level and increasing said data traffic measurements if the user operates outside of the specified network usage parameters, and increasing said trust level and reducing said data traffic measurements if the user operates within said specified network usage parameters for a set period of time.

2. The method of claim 1 further comprising associating one or more control policies with each of said trust levels and enforcing said control policies based on said trust level of each of said plurality of users.

3. The method of claim 1 wherein assigning a trust level comprises analyzing network traffic data measurements associated with said plurality of users.

4. The method of claim 1 further comprising updating said specified network usage parameters upon receiving input from an external updater interface.

5. The method of claim 1 wherein said trust levels comprise three or more trust levels.

6. The method of claim 1 wherein the network usage parameters are specified in an agreement between the user and a network provider.

7. The method of claim 1 further comprising transmitting a notification upon modifying said trust level of the one or more of said plurality of users.

8. The method of claim 1 further comprising:
    transmitting a warning to one of said plurality of users if the user is operating beyond a first threshold but within said specified network usage parameters; and
    transmitting a notification to the service provider.

9. The method of claim 1 wherein said network usage parameters used to determine said trust level of the user comprise a bandwidth limit and a set period of time over which the bandwidth limit is exceeded.

10. An apparatus comprising:
    a database for storing a list of users and a trust level assigned to each of the users;
    a monitor operable to monitor traffic associated with each of the users, wherein a level of monitoring is based on said trust level of the user, wherein the monitor is operable to measure data traffic transmitted between the apparatus and each of the users assigned a trust level; and
    a processor for setting said trust level for each of the users, setting said monitoring level for each of the users based on said trust level of the user, analyzing the monitored traffic, and modifying said trust level of one or more of the users if the analyzed traffic indicates that the one or more of the users is operating outside of specified network usage parameters;
    wherein analyzing the monitored traffic comprises comparing said measured data traffic to the specified network usage parameters and modifying said trust level of the user comprises decreasing said trust level and increasing said data traffic measurements if the user operates outside of the specified network usage parameters, and increasing said trust level and reducing said data traffic measurements if the user operates within said specified network usage parameters for a set period of time.

11. The apparatus of claim 10 wherein the monitor operates at layer 4 through layer 7 of the network.

12. The apparatus of claim 10 wherein the processor is further configured to apply one or more traffic control policies based on said trust level of the user.

13. The apparatus of claim 10 wherein the network usage parameters are specified in an agreement between the user and a network provider.

14. The apparatus of claim 10 wherein the processor is configured to transmit a notification upon modifying said trust level of the one or more of the users.

15. The apparatus of claim 10 wherein the processor is configured to:
transmit a warning to one of said plurality of users if the user is operating beyond a first threshold but within said specified network usage parameters; and
transmit a notification to the service provider.

16. The apparatus of claim 10 wherein the processor is configured to update specified network usage parameters based on updates received at the apparatus.

17. Logic encoded on one or more non-transitory computer readable media for execution and when executed operable to:
assign a trust level to each of a plurality of users;
set a monitoring level for each of the users based on said trust level of the user;
monitor traffic associated with each of the users, wherein computer code that monitors comprises computer code that measures data traffic transmitted between the system and each of said plurality of users assigned a trust level;
analyze the monitored traffic, wherein computer code that analyzes comprises computer code that compares said measured data traffic to specified network usage parameters; and
modify said trust level of one or more of the plurality of users if the analyzed traffic indicates that the one or more of the users is operating outside of the specified network usage parameters;
wherein modifying said trust level of the user comprises decreasing said trust level and increasing said data traffic measurements if the user operates outside of the specified network usage parameters, and increasing said trust level and reducing said data traffic measurements if the user operates within said specified network usage parameters for a set period of time.

18. The logic of claim 17 wherein computer code that monitors comprises computer code that monitors the traffic at layer 4 through layer 7 of the network.

19. The logic of claim 17 wherein said network usage parameters are specified in an agreement between the user and a network provider.

20. The logic of claim 17 wherein said network usage parameters used to determine said trust level of the user comprise a bandwidth limit and a set period of time over which the bandwidth limit is exceeded.

* * * * *